United States Patent
Holm et al.

(10) Patent No.: US 12,107,833 B2
(45) Date of Patent: Oct. 1, 2024

(54) CONFIGURABLE PROXYING APPLICATION PROGRAM INTERFACE FAÇADE SERVICE

(71) Applicant: Charter Communications Operating, LLC, St. Louis, MO (US)

(72) Inventors: Colin Holm, Denver, CO (US); Jonathan Svede, Centennial, CO (US); Aathilingam Sivalingam, Highlands Ranch, CO (US); Andrew Lenoir, Greenwood Village, CO (US); Hayley Armstrong, Denver, CO (US); Kar Yen Dick, Greenwood Village, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 244 days.

(21) Appl. No.: 17/841,065

(22) Filed: Jun. 15, 2022

(65) Prior Publication Data

US 2023/0412570 A1      Dec. 21, 2023

(51) Int. Cl.
*H04L 9/40* (2022.01)
*H04L 67/133* (2022.01)

(52) U.S. Cl.
CPC ...... *H04L 63/0281* (2013.01); *H04L 63/0892* (2013.01); *H04L 67/133* (2022.05)

(58) Field of Classification Search
None
See application file for complete search history.

(56) References Cited

U.S. PATENT DOCUMENTS

| | | | |
|---|---|---|---|
| 9,886,267 B2 | 2/2018 | Maheshwari et al. | |
| 9,921,894 B1* | 3/2018 | O'Kennedy | G06F 9/541 |
| 10,609,165 B1* | 3/2020 | Chauhan | H04L 67/02 |
| 10,735,262 B1* | 8/2020 | Webb | H04L 41/0866 |

(Continued)

OTHER PUBLICATIONS

Apigee: "Understanding APIs and API proxies", Site Visited [Mar. 4, 2022], pp. 1-4, Retrieved from Internet URL: https://docs.apigee.com/api-platform/fundamentals/understanding-apis-and-api-proxies.

(Continued)

*Primary Examiner* — Kaveh Abrishamkar
(74) *Attorney, Agent, or Firm* — Young Basile Hanlon & MacFarlane, P.C.

(57) ABSTRACT

Methods and systems for a configurable proxying application program interface (API) façade service. A method for using a proxying API façade service includes, for each proxying API façade, selecting exposed endpoint(s) associated with proxy subject API(s), each selected exposed endpoint corresponding to a mapped proxy endpoint in a proxying API façade, selecting one or more components, setting one or more rights and policies, storing one or more mapped proxy endpoints, the one or more components, and the one or more rights and policies as proxying API façade configuration data in an externalized configuration store, generating each proxying API façade by loading a corresponding proxying API façade configuration data from the externalized configuration store, and integrating a proxy client of each proxying API façade with a credential management server, the credential management server config- (Continued)

ured to authenticate access to a proxy subject API by a proxy client responsive to a client request.

20 Claims, 6 Drawing Sheets

(56) References Cited

U.S. PATENT DOCUMENTS

| | | | |
|---|---|---|---|
| 2012/0179913 A1* | 7/2012 | Kirk | G06F 21/10 |
| | | | 713/176 |
| 2015/0006318 A1* | 1/2015 | Thaker | H04L 67/142 |
| | | | 705/26.8 |
| 2016/0014116 A1* | 1/2016 | Babbidge | G06F 21/35 |
| | | | 726/6 |
| 2016/0127454 A1* | 5/2016 | Maheshwari | G06F 8/30 |
| | | | 709/223 |
| 2018/0357114 A1* | 12/2018 | O'Kennedy | H04L 67/567 |
| 2019/0114626 A1* | 4/2019 | Pogorelik | G06F 16/1824 |
| 2020/0142544 A1* | 5/2020 | Fleck | G06F 16/954 |
| 2021/0073618 A1* | 3/2021 | Boussarov | G06N 3/045 |
| 2022/0159011 A1* | 5/2022 | Rinehart | H04L 63/108 |

OTHER PUBLICATIONS

Ldapwiki: "API-Gateway", Site Visited [Mar. 4, 2022], pp. 1-7, Retrieved from Internet URL: https://ldapwiki.com/wiki/API-Gateway.

Ambassador: "Deploying Envoy Proxy as an API Gateway for Microservices", Site Visited [Mar. 4, 2022], pp. 1-4, Retrieved from Internet URL: https://www.getambassador.io/resources/envoy-as-api-gateway/.

* cited by examiner

CONFIGURABLE PROXYING APPLICATION PROGRAM INTERFACE FAÇADE SERVICE

TECHNICAL FIELD

This disclosure relates to network communications. More specifically, providing a façade service to create and document façades for proxy subject API endpoints.

BACKGROUND

Proxy services or servers are used as intermediary between a client device requesting a service and a system providing the service. Façades serve as interfaces that interact with client devices, application program interface (API) gateways, and proxy services. The façades mask the complexity of systems needed to interact with the client devices, the API gateways, and the proxy services. This simplifies integration or interaction with the client devices, the API gateways, and the proxy services.

Deployment and later reconfiguration of deployed façades, however, are inefficient and can result in more than acceptable downtime of the relevant systems.

SUMMARY

Disclosed herein are methods and systems for a configurable proxying API façade service.

In implementations, a method for using a proxying application program interface (API) façade service includes, for each proxying API façade, selecting one or more exposed endpoints associated with one or more proxy subject APIs, each selected exposed endpoint corresponding to a mapped proxy endpoint in a proxying API façade, selecting one or more components, setting one or more rights and policies, storing one or more mapped proxy endpoints, the one or more components, and the one or more rights and policies as proxying API façade configuration data in an externalized configuration store, generating each proxying API façade by loading a corresponding proxying API façade configuration data from the externalized configuration store, and integrating a proxy client of each proxying API façade with a credential management server, the credential management server configured to authenticate access to a proxy subject API by a proxy client responsive to a client request.

In implementations, a service provider system includes a configuration store, a credential management server, and a proxying application program interface (API) façade service deployed in a cloud computing platform. The proxying application program interface (API) façade service configured to, for each proxying API façade, receive an input of one or more exposed endpoints associated with one or more proxy subject APIs, each selected exposed endpoint corresponding to a mapped proxy endpoint in a proxying API façade, receive an input for one or more components, receive an input for one or more rights and policies, store one or more mapped proxy endpoints, the one or more components, and the one or more rights and policies as proxying API façade configuration data in the configuration store, instantiate, on the cloud computing platform, each proxying API façade by loading a corresponding proxying API façade configuration data from the configuration store, and connect a proxy client of each proxying API façade with the credential management server, the credential management server configured to authenticate access to a proxy subject API by a proxy client responsive to a client request.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device", or "cloud computing system" includes any unit, or combination of units, capable of performing any method, or any portion or portions thereof, disclosed herein. For example, the "server", "computer", "computing device", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for employing a configurable proxying API façade service to generate and deploy proxying API façades and to reconfigure deployed proxying API façades with minimal or no system downtime. The configurable proxying API façade service enables developers or users of the configurable proxying API façade service (referred to herein as a developer user) to quickly create secure, documented proxying API façades (referred to herein as a "proxying API façade or proxying API façade instance" as appropriate) for proxy subject API endpoints (also referred to herein as "exposed endpoints (EE)"). For example, the develop user can expose a subset of proxy subject API endpoints in order to prevent unauthorized access and visibility to sensitive proxy subject API endpoints. A developer user can configure a proxying API façade instantiation with a proxy client and one or more features, including but not limited to, security, validation, transformation, projection, interceptors, and auditing event integrations. An externalized configuration can operate with the configurable proxying API façade service to quickly deploy secure, documented proxying API façades for selected proxy subject API endpoints. Updates to the externalized configuration can be used to deploy additional proxying API façades with minimal or no system downtime.

Developer users can create their own authentication and authorization policies decoupled from a proxy source's or proxy subject's (collectively "proxy subject") policies, i.e., a proxy for a source or provider of services. That is, the proxying API façade can control its own authentication and authorization policies. This allows users to anticipate and react to threats and breaches without depending on the proxy subject. In addition, reactions to credential breaches and other issues can be addressed with zero down time of the system including the proxying API façade. The proxy client of the proxying API façade can integrate with a credential management service to authenticate proxy client requests to the proxy subject, allowing developer users and/or proxy subject API providers to more efficiently maintain access control policies to proxy subject API endpoints. In some implementations, the proxy client can acquire authentication tokens for the proxy subject API. Integration with the credential management service enables the control of authentication and authorization policies for all clients of a proxying API façade instance via a centralized policy. In some implementations, the externalized configuration can be used to set authentication and authorization policies for the proxying API façade, all mapped endpoints, per mapped endpoint, and/or combinations thereof.

In some implementations, the proxying API façade instance can include an auditor to provide a secure event driven mechanism which allows authorized external applications to have visibility into API endpoint façade request and response details such as, but not limited to, request headers and response headers. Visibility can also extend to the proxying API façade as well, such as, proxying API façade metadata and processing times. External applications can gather and use this auditing data for any number of use cases, including but not limited to, high level metrics and debugging individual requests.

In some implementations, the proxying API façade instance can include a transformer which can transform client requests and proxy subject API responses. The transformer can be leveraged for many use cases, including but not limited to, encrypting sensitive request and response metadata and porting response contracts to existing or new integrations.

In some implementations, the proxying API façade instance can include a response body projection which processes the proxy subject API response to include only certain fields from the proxy subject API response body. In some implementations, the certain fields can be configurable. This enables efficient data exchange by reducing response size, and securing metadata by removing sensitive fields.

In some implementations, the proxying API façade instance can include a validator for processing a request and/or a response which can validate the request uniform resource locator (URL), response parameters, request parameters, query parameters, request (response) body, and other parameters, as appropriate and applicable. The configurable proxying API façade service can enable provision of uniform or custom per proxying API façade instance input validation and sanitization separate from the proxy subject API. The validator can report invalid input in a consistent way.

In some implementations, the proxying API façade instance can include interceptors. The interceptors can extend the proxying API façade capabilities for all, or any particular subset of, proxy subject API endpoints. The interceptors can be present for request processing, response processing, or combinations thereof. This enables developer users to enhance the proxying API façade instance with whatever additional functionality is needed.

In some implementations, the configurable proxying API façade service can enable provision of uniform error handling across the entire set of API endpoint facades and allow for integrating with existing proxy subject API capabilities as well as providing enhanced capabilities without depending on the proxy subject API. That is, features and capabilities can be provided independent of the source of the service and/or proxy subject API.

The configurable proxying API façade service enables definition of default query parameters controlling requests from the client to the proxy subject. With the default query parameters, a developer user will have an option to configure the query parameters of a proxying API façade to a default value. Developer users can configure, for any given proxy API façade endpoint, default query parameters to include on every request to the proxy subject API endpoint. This allows developer users to, among other things, simplify client integration with the proxying API façade and ensure consistency in some aspects of the proxying API façade's integration with a proxy subject API (e.g., a developer user could ensure that the proxying API façade never requests more than 100 results from the proxy subject API endpoint).

In some implementations, a provider of a service or a proxy subject API associated with the service can provide various clients or client devices associated with the clients with different subsets of mapped proxy endpoints that are exposed in the proxy subject API. The credential management service enables the provider to control access for all client devices to the proxying API façade.

In some implementations, the proxy subject API can be a third party provided proxy subject API which is associated with the service provided by the provider. In this instance, the proxying API façade can provide secure access to the third party provided proxy subject API.

Figure 1:
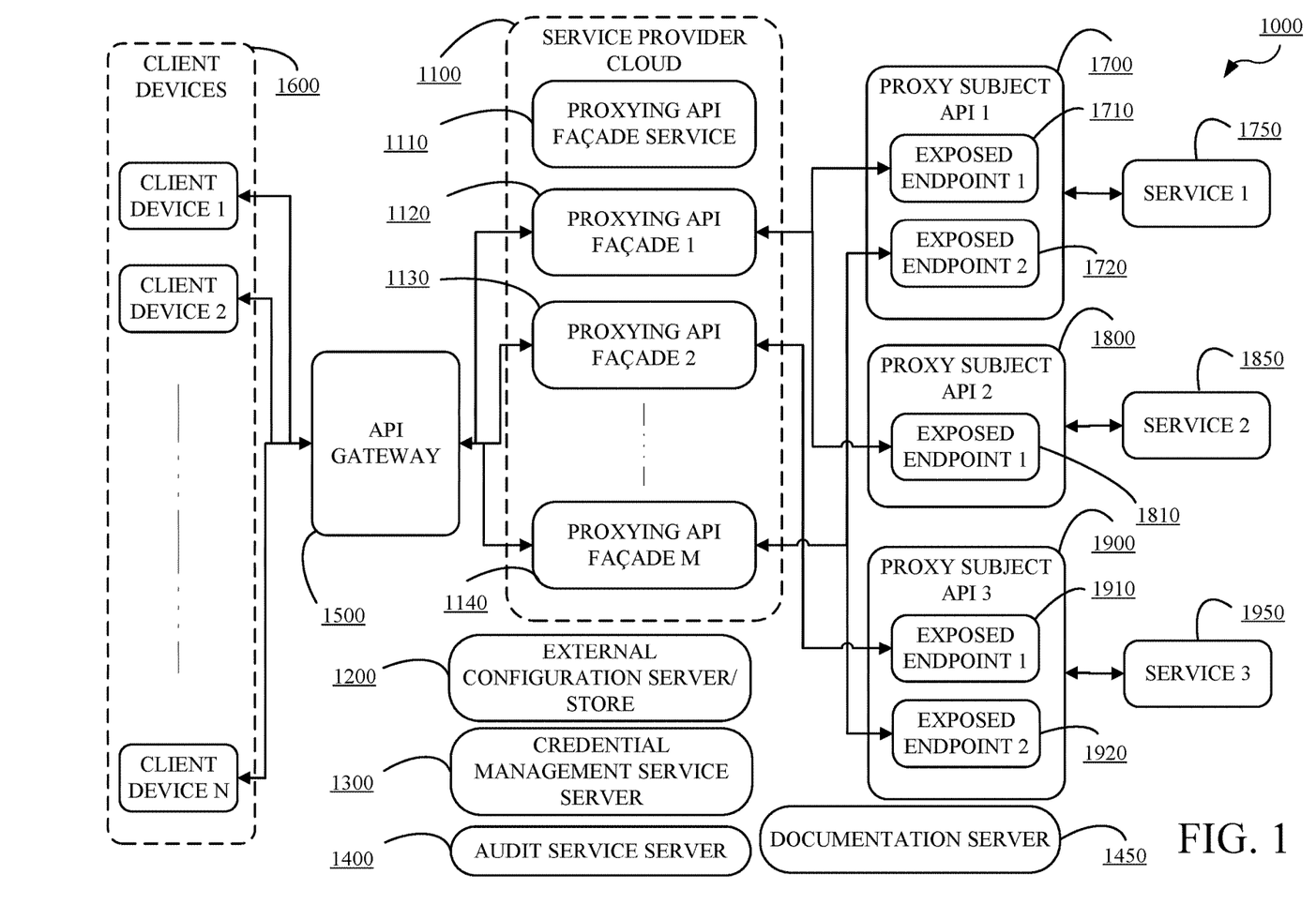
FIG. 1 is a diagram of an example of a network architecture with a configurable proxying API façade service in accordance with embodiments of this disclosure.

FIG. 1 is a diagram of an example of a network architecture 1000 with a configurable proxying API façade service in accordance with embodiments of this disclosure. The network architecture 1000 can include a service provider cloud 1100, an external configuration server or store 1200, a credential management server 1300, an audit service server 1400, an API gateway 1500, client devices 1, 2, ..., N 1600, proxy subject API 1 1700 associated with service 1 1750, proxy subject API 2 1800 associated with service 2 1850, and proxy subject API 3 1900 associated with service 3 1950. The proxy subject API 1 1700 can expose and include, but is not limited to, proxy endpoint 1 1710 and proxy endpoint 2 1720. The proxy subject API 2 1800 can expose and include, but is not limited to, proxy endpoint 1 1810. The proxy subject API 3 1900 can expose and include, but is not limited to, proxy endpoint 1 1910 and proxy endpoint 2 1920. In some implementations, one or more of the external configuration server 1200, the credential management server 1300, and the audit service server 1400 can be deployed on or integrated on the service provider cloud. Communications between the described devices or elements can include wired communications, wireless communications, or a combination thereof. The network architecture 1000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

A proxying API façade service 1110 can be deployed on the service provider cloud 1100. The proxying API façade service 1110 is built and deployed as a microservice, which is implemented with a RESTful API defined in the external configuration server 1200. The proxying API façade service 1110 enables a developer user to set or define one or more proxying API façades as described herein and store the definition in the external configuration server 1200. The proxying API façade service 1110 can load the external configuration server 1200 at runtime. The proxying API façade service 1110 together with the external configuration server 1200 can instantiate or generate one or more proxying API façades such as, but not limited to, proxying API façade 1 1120, proxying API façade 2 1130, . . . , proxying API façade M 1140.

Each of the proxying API façade 1 1120, proxying API façade 2 1130, . . . , proxying API façade M 1140 can integrate or communicate with one or more proxy subject APIs such as the proxy subject API 1 1700, the proxy subject API 2 1800, and/or the proxy subject API 3 1900. In particular, each of the proxying API façade 1 1120, proxying API façade 2 1130, . . . , proxying API façade M 1140 can integrate or communicate with one or more exposed endpoints in the one or more proxy subject APIs. For example, the proxying API façade 1 1120 can integrate or communicate with exposed endpoint 1 1710 of the proxy subject API 1 1700 and exposed endpoint 1 1810 of the proxy subject API 2 1800. For example, the proxying API façade 2 1130 can integrate or communicate with exposed endpoint 1 1910 of the proxy subject API 3 1900. For example, the proxying API façade M 1140 can integrate or communicate with exposed endpoint 2 1720 of the proxy subject API 1 1700 and exposed endpoint 2 1920 of the proxy subject API 3 1900.

Each of the proxying API façade 1 1120, proxying API façade 2 1130, . . . , proxying API façade M 1140 can integrate or communicate with the credential management server 1300 to obtain authentication credentials for the relevant or appropriate one or more proxy subject APIs.

Each of the proxying API façade 1 1120, proxying API façade 2 1130, . . . , proxying API façade M 1140 can integrate or communicate with the audit service server 1400 via an auditor component to send reports, activities, error logs, and the like for triggering auditing events.

The external configuration server 1200 can be loaded with configuration data or information regarding the one or more proxying API façade instantiations such as, but not limited to, the proxying API façade 1 1120, the proxying API façade 2 1130, . . . , the proxying API façade M 1140. The configuration data or information can include, but is not limited to, a mapping, a listing, an enumeration, or other mechanism (collectively "mapping") for defining one or more exposed endpoints associated with or connected to a given proxying API façade (a mapped proxy endpoint), components for a given proxying API façade, components for each mapped proxy endpoint, rights and policies as described herein, and/or combinations thereof. The configuration data or information can be stored in memory. At startup, the proxying API façade service 1110 can load the configuration from the memory. During runtime, the proxying API façade service 1110 can include an option to reload the configuration without having to restart the service or system. That is, there is no service or system downtime.

The proxying API façade service 1110 together with the external configuration server 1200 can provide one or more proxying API façades such as, but not limited to, proxying API façade 1 1120, proxying API façade 2 1130, . . . , proxying API façade M 1140, with a variety of components and rights and policies as described herein. That is, the proxying API façade service 1110 enables selecting a flexible and configurable set of components and selecting one or more exposed endpoints to be associated with for a given proxying API façade. In some implementations, a given proxying API façade can process requests and responses using the same components for all mapped proxy endpoints, can process requests and responses using different components for each mapped proxy endpoint, and/or combinations thereof. In some implementations, a given proxying API façade can process requests and responses on a per mapped proxy endpoint basis, i.e., the set of components for each mapped proxy endpoint is independent of the set of components for other mapped proxy endpoints. In some implementations, each of the one or more proxying API façades can have a same set of components, a different set of components, and/or combinations thereof. In some implementations, each mapped proxy endpoint in the one or more proxying API façades can have a different set of components, a same set of components, and/or combinations thereof.

The variety of components can include, but is not limited to, providing unified documentation for all proxying API façades using a documentation server 1450, authentication and authorization of requests from client devices to a proxying API façade, checking whether a given request is configured for a proxying API façade, loading and leveraging custom request and response interceptors for extending proxying API façade capabilities, proxying and authentication of requests to the appropriate exposed endpoint in a proxy subject API, validating and transforming request and response metadata, projecting response bodies (received from appropriate exposed endpoints) the proxying API façade provides the client devices, auditing each request (and its response) traversing the proxying API façade to and from the client device and the proxy subject API, and/or other features.

The proxying API façade service 1110 can enable the developer user to define and set rights and policies for each component in a proxying API façade. In some implementations, the rights and policies for each component can be done on a per mapped proxy endpoint for the proxying API façade or across all mapped proxy endpoints for the proxying API façade. The rights and policies can be set independent of, for example, the client devices/clients or the proxy subject API/service. For example, the rights and policies can include, but is not limited to, security, authentication, authorization, request format, response format, communication format, data redaction, response projection, and the like.

The client devices 1, 2, . . . , N 1600 can be, but are not limited to, Internet of Thing (IoT) devices, end user devices, cellular telephones, Internet Protocol (IP) devices, mobile computers, laptops, handheld computers, personal media devices, smartphones, notebooks, notepads, servers, and the like which are capable, configured, and/or provisioned for operation with or in the network architecture 1000.

The API gateway 1500 is a server or mechanism which is a point of entry for routing requests and responses between the client devices 1600 and microservices such as the proxying API façade service 1110 and the one or more proxying API façades such as, but not limited to, the proxying API façade 1 1120, the proxying API façade 2 1130, . . . , the proxying API façade M 1140.

The credential management server 1300 can provide management of access credentials between the one or more proxying API façade instantiations such as, but not limited to, the proxying API façade 1 1120, the proxying API façade 2 1130, . . . , the proxying API façade M 1140 and the appropriate one or more proxy subject APIs, such as, but not limited to, the proxy subject API 1 1700, the proxy subject API 2 1800, and the proxy subject API 3 1900. For example, the credential management server 1300 can receive an access request from a proxying API façade to acquire authentication and/or access credentials, such as a token, for a proxy subject API or a service associated with the proxy subject API. The credential management server 1300 can send a response comprising the authentication and/or access credentials to the proxying API façade to access the proxy subject API using the authentication and/or access credentials. An example of a credential management server 1300 is described in United States Patent Application Publication No. 20210392131 A1, filed on Jun. 15, 2020, and entitled "MANAGEMENT OF ACCESS CREDENTIALS", the contents of which are herein incorporated by reference as if fully set forth.

The audit service server 1400 can receive reports, activities, error logs, and the like from one or more proxying API façade instantiations such as, but not limited to, the proxying API façade 1 1120, the proxying API façade 2 1130, . . . , the proxying API façade M 1140. The audit service server 1400 can trigger audits in accordance with or based on the received data.

Figure 2:
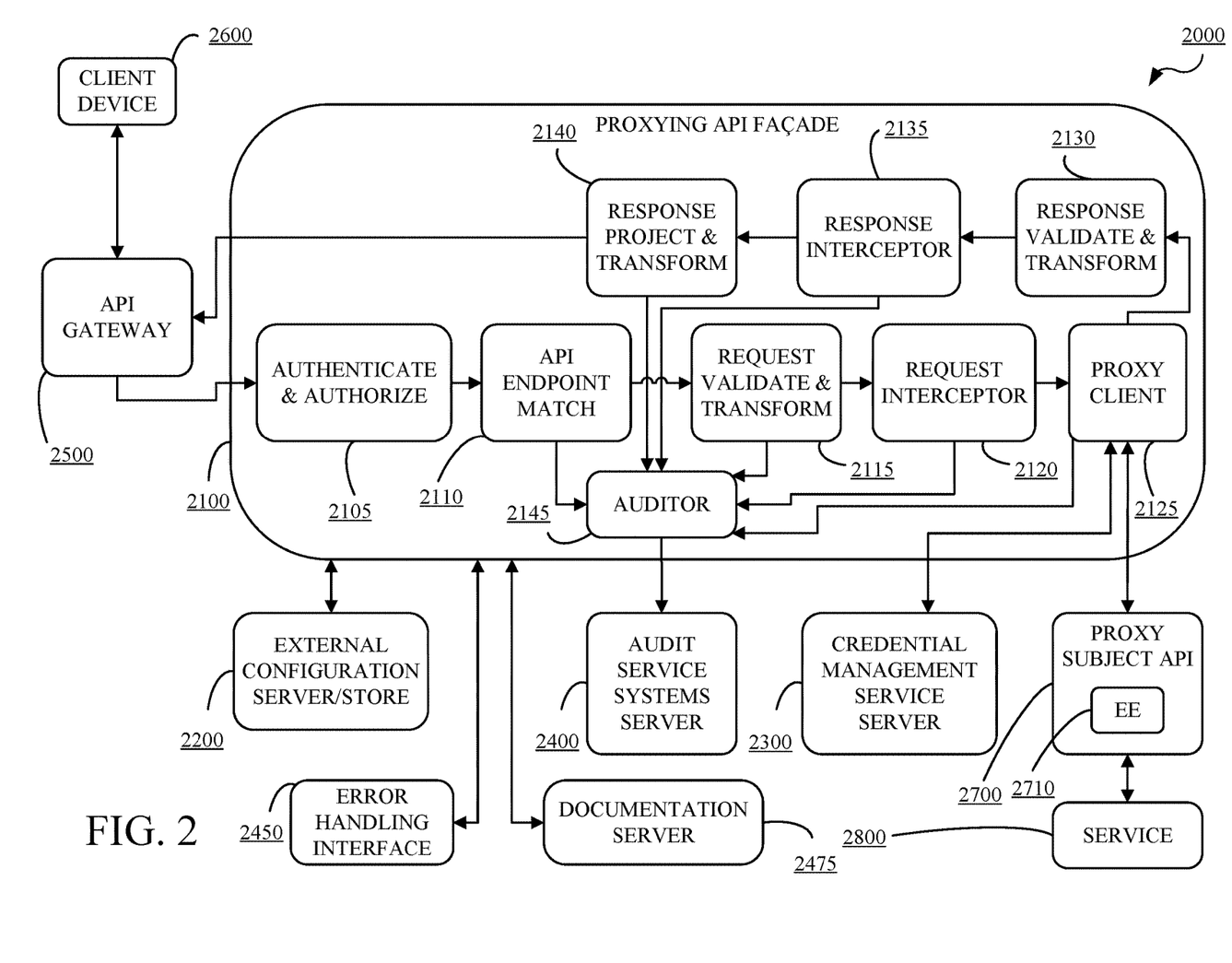
FIG. 2 is a diagram of an example of a network architecture with a proxying API façade instance in accordance with embodiments of this disclosure.

FIG. 2 is a diagram of an example of a network architecture 2000 with a proxying API façade instance 2100 in accordance with embodiments of this disclosure. The network architecture 2000 can include a proxying API façade 2100 with can be instantiated on a cloud computing system as shown in FIG. 1, an external configuration server 2200, a credential management server 2300, an audit service systems server 2400, an error handling interface 2450, an API gateway 2500, a client device 2600, and a proxy subject API 2700 associated with a service 2800. The proxy subject API 2700 can expose and include, but is not limited to, exposed endpoint (EE) 2710. In some implementations, one or more of the external configuration server 2200, the credential management server 2300, and the audit service server 2400 can be deployed on or integrated on the service provider cloud. Communications between the described devices or elements can include wired communications, wireless communications, or a combination thereof. The network architecture 2000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

The external configuration server 2200, the credential management server 2300, the audit service systems server 2400, the API gateway 2500, and the client device 2600 are as described with respect to FIG. 1.

The proxying API façade service can provide an error handling interface 2450, which can provide a uniform, and extensible, error handling interface for all mapped proxy endpoints, mapped endpoints, or proxy endpoints (collectively "mapped proxy endpoints"). The error handling interface 2450 is decoupled from the proxy subject API 2700. This can enable developer users, client devices/clients, or combinations thereof to leverage proxy subject error handling where appropriate and override or extend as needed. This can provide a consistent interface for error reporting to all proxy endpoint clients, creating opportunities for more easily encapsulating cross cutting reporting and/or interventions on the client side. Moreover, all errors can be reported via an auditor component 2145 to the audit service systems server 2400. This can allow for error rate analysis, broad scale defect triage, and other error analysis.

A proxying API façade service, such as the proxying API façade service 1110 of FIG. 1, can load the external configuration server 2200 at runtime to instantiate or generate the proxying API façade 2100. The configuration and features of the proxying API façade 2100 can be set and stored by a developer user in the external configuration server 2200. A developer user can select the exposed endpoints, define a set of a components, and appropriate rights and policies supported by the proxying API façade 2100. The developer user can enhance the functionality of the proxying API façade 2100 by configuring one or more of the features as described herein. The proxying API facade service can provide and document the secure proxying API façade 2100 for selected exposed endpoints from one or more proxy API subjects, the selected components, and the rights and policies associated therewith. This can be done, for example, by a documentation server 2475. The documentation can be provided to appropriate client devices/clients. In some implementations, the documentation is tailored for each client device/client depending on the exposed endpoints and the rights and policies relevant to each client device/device.

The proxying API façade 2100 is illustrative of a set of features and mapped proxy endpoints and can include one or more additional or different features and mapped proxy endpoints as defined by the developer user. In this instantiation example, the proxying API façade 2100 can include an authentication and authorization component 2105, an API endpoint match component 2110, a request validate and transform component 2115, a request interceptor component 2120, a proxy client 2125, a response validate and transform component 2130, a response interceptor component 2135, a response project and transform component 2140, and an auditor component 2145. The order of processing with respect to the defined components is illustrative. One or more components can be organized in a different process flow without departing from the scope of the specification and claims. In some implementations, a component can include one feature or multiple features. Features can be mixed and matched as defined by the developer user. For example, components with multiple features can be separated into multiple components.

The authentication and authorization component 2105 can process or perform authentication and authorization for the client device 2600 for accessing or integrating with the proxying API façade 2100 in accordance with rights and policies provided by a developer user. That is, the client device 2600 can provide a username and password or other access mechanism to the authentication and authorization component 2105 to access the proxying API façade 2100. The proxying API façade service can enable a developer user to configure authentication policies decoupled from the proxy subject API 2700. This decoupling allows the proxying API façade service to maintain its own access control policies without depending on the proxy subject API. The proxying API façade service can enable a developer user to configure authorization policies decoupled from the proxy subject API. Authorization policies can be configured uniformly across all mapped proxy endpoints, per mapped proxy endpoint, and/or overridden at an individual mapped proxy endpoint to provide custom policies per mapped proxy endpoint. Authorization policies further secure the mapped proxy endpoints by ensuring that only authorized client devices/clients can make requests to certain mapped proxy endpoints. In some implementations, the proxying API façade service can enable a developer user to integrate with the credential management service server 2300 to provide authentication capabilities to the client devices/ clients, to integrate with the credential management service server 2300 to provide authorization capabilities to the client devices/clients.

The proxy client 2125 can send requests to and receive response from the proxy subject API for an exposed endpoint 2710. The proxying API façade service can enable a developer user to integrate with the credential management service server 2300 to authenticate requests to the proxy subject API endpoints, i.e., exposed endpoint 2710. The developer user can configure the appropriate data for the proxying API façade 2100 to pass to the credential management service server 2300 to acquire authentication tokens. The proxying API façade 2100 then uses those tokens to make authenticated requests to the proxy subject API 2700 or exposed endpoint 2710, as appropriate. Integration with the credential management service server 2300, enables for integration with the authorization policies of the proxy subject API provider or service, i.e., service 2800. This allows developer users and/or proxy subject API providers/ service to anticipate and react to security threats and breaches in an efficient way. The proxy client 2125 can send request and response logs to the auditor component 2145.

The authentication and authorization component 2105 and the integration of the proxy client 2125 with the credential management service server 2300 can be collectively considered an authorization proxy, authorization proxy endpoint, or authenticating proxy (collectively "authenticating proxy"). The proxying API façade service can enable a developer user to configure the rights and policies as described herein with respect to the client devices/clients and proxy subject APIs and/or services. In this sense, the authenticating proxy can provide, perform, or act as a mapped proxy for an exposed endpoint in a proxy subject API, and authenticate requests to the exposed endpoint. A proxying API façade, via the authenticating proxy, can take care of the authentication against the proxy subject API, which both simplifies client side integration with the proxying API façade and provides a more secure context to authenticate against the proxy subject API. That is, no sharing of credentials or creation of individual credentials for every client. This would be especially burdensome when you are already providing credentials to the proxying API façade itself. In contrast, previous proxies, such as in an API gateway, pass request data (including authentication data) through to the exposed endpoint. In these cases, client devices/clients are responsible for authenticating against the proxy subject API, even though they aren't integrating with it directly. The authenticating proxy rights and policies can be handled at a mapped proxy endpoint level for a given proxying API façade, across all mapped proxy endpoints for a given proxying API façade, across all proxying API façades, and/or combinations thereof.

The API endpoint match component 2110 can compare, via the external configuration server 2200, the exposed endpoint(s) identified or indicated in a request from the client device 2600 to a mapped proxy endpoint or list of mapped proxy endpoints stored for the API endpoint match component 2110 or proxying API façade 2100. Request data, exposed endpoint, matching results, error(s), and other data can be sent to the auditor component 2145. Errors can also be sent or processed via the error handling interface 2450 as described herein.

The request validate and transform component 2115 can provide uniform request metadata validation. This can be used to override or to customize policies at the individual mapped proxy endpoint level. This allows for validation and sanitization of the request URL, response parameters, request parameters, query parameters, body, and like items separate from the proxy subject API 2700 and report invalid input in a consistent way. The request validate and transform component 2115 can be used by developer users to configure and transform client requests. Such transformations can be leveraged for many use cases, including encrypting and/or decrypting sensitive request data, providing default values for request body properties, and the like. In some implementations, the request validate and transform component 2115 can be a request validate component and a request transform component. In some implementations, the request validate and transform component 2115 and variations thereof can advantageously reduce or improve traffic resulting from bad or invalid calls made to the proxy subject API 2700 by performing upfront validation through the proxying API façade 2100. In some implementations, the request validate and transform component 2115 and variations thereof can advantageously sanitize request data to protect against vulnerabilities like log4shell without depending on or waiting on proxy subject API providers to address the issue on the proxy subject API side.

The request interceptor component 2120 can enable developer users to extend the proxying API facade 2100 capabilities. The request interceptor component 2120 can encapsulate custom functionality which can be applied to any given request or a set of requests. For example, a developer user can create or define a request interceptor component 2120 to apply a business logic driven dynamic transformation across all mapped proxy endpoints, or trigger a custom event for a single mapped proxy endpoint.

The response validate and transform component 2130 can provide uniform response metadata validation. This can be used to override or to customize policies at the individual mapped proxy endpoint level. This allows for validation and sanitization of the response HTTP status code, body, response headers, and like items separate from the proxy subject API 2700 and report invalid output in a consistent way. The response validate and transform component 2130 can be used by developer users to transform proxy subject API responses. Such transformations can be leveraged for many use cases, including encrypting and/or decrypting sensitive response data, porting response contracts to existing or new integrations, and the like. In some implementations, the response validate and transform component 2130 can be a response validate component and a response transform component. In some implementations, the response validate and transform component 2130 and variations thereof can detect certain compromised architectures, such as man in the middle attacks between the proxying API façade and proxy subject APIs without depending on or waiting on proxy subject API providers to address the issue on the proxy subject API side.

The response interceptor component 2135 can enable developer users to extend the proxying API facade 2100 capabilities. The response interceptor component 2135 can encapsulate custom functionality which can be applied to any given response or a set of responses. For example, a developer user can create or define a response interceptor component 2135 to apply a business logic driven dynamic transformation across all mapped proxy endpoints, or trigger a custom event for a single mapped proxy endpoint.

The response project and transform component 2140 can enable developer users to configure response body projections. That is, the response project and transform component 2140 can be defined to configure only a subset of the fields from a proxy subject API or service (which may be transformed) response to be included in the proxying API façade's response. By including only certain fields from the proxy subject API response body allows for more efficient data exchange by reducing response size and securing metadata by removing sensitive fields. Transformation of certain fields refers to displaying the fields in different manners, formats, and the like.

The auditor component 2145 can prepare, write, or document an audit log summarizing every request and response processed by the proxying API façade 2100. The audit log can be sent via or implemented as a message bus or service such as, but not limited to, broadcast message topics (e.g., Kafka), message queues (e.g., RabbitMQ), logs, and the like. The auditor component 2145 can receive input or messages from the API endpoint match component 2110, the request validate and transform component 2115, the request interceptor component 2120, the response validate and transform component 2130, the response interceptor component 2135, the response project and transform component 2140, the proxy client 2125, and other relevant components. The auditor component 2145 can send the audit log to the audit service system server 2400.

Referring now to FIGS. 1 and 2, operationally, as noted herein, the developer user can, via the proxying API façade service 1110, define one or more proxying API façade(s). The developer user can, via the proxying API façade service 1110, define, for each of the one or more proxying API façade(s), one or more exposed endpoints from one or more proxy subject APIs, define components and features, and define rights and policies for each of the exposed endpoints, the components and the one or more proxying API façade(s) as described herein. In some implementations, the documentation for the instantiated one or more proxying API façade(s) can be published to appropriate client devices or clients such as client devices 1, 2, . . . N 1600 or client device 2600, to an external location that is accessible, via the Internet, to any and all clients or potential clients, or combinations thereof.

A request can be sent by a client device, such as client devices 1, 2, . . . N 1600 or client device 2600 via the API gateway 2500 toward a service, such as service 1 1750, service 2 1850, service 3 1950, or service 2800. The request can be sent along with authorization and/or authentication credentials for accessing the appropriate proxying API façade. In general, the request can include at least an identification of an exposed endpoint.

The authorization and/or authentication credentials from the client device 2600, for example, can be checked by the authentication and authorization component 2105. If the authorization and/or authentication credentials are confirmed, the request is processed using the configured components. This can include the API endpoint match component 2110, which can compare the exposed endpoint against the mapped proxy endpoint or list of mapped proxy endpoints. If authorized and authenticated and exposed endpoint matches, the request can be processed by the request validate and transform component 2115 and the request interceptor component 2120 as described herein. After request processing, the proxy client 2125 can then obtain access tokens from the credential management server 2300 as described herein to access the proxy subject API 2700 and the exposed endpoint 2710.

The proxy client 2125 can receive a response from the proxy subject API 2700 and the exposed endpoint 2710 on behalf of the service 2800. The response is processed through the configured components. This can include processing by the response validate and transform component 2130, the response interceptor component 2135, and the response project and transform component 2140. The processed response is sent via the API gateway 2500 to the client device 2600.

The components in the request processing and the response processing can send reports, errors, and other information to the auditor component 2145 for analysis by the audit service systems server.

The components in the request processing and the response processing can send errors to the external handling interface 2450 for processing by a developer user, a client, or other user.

Figure 3:
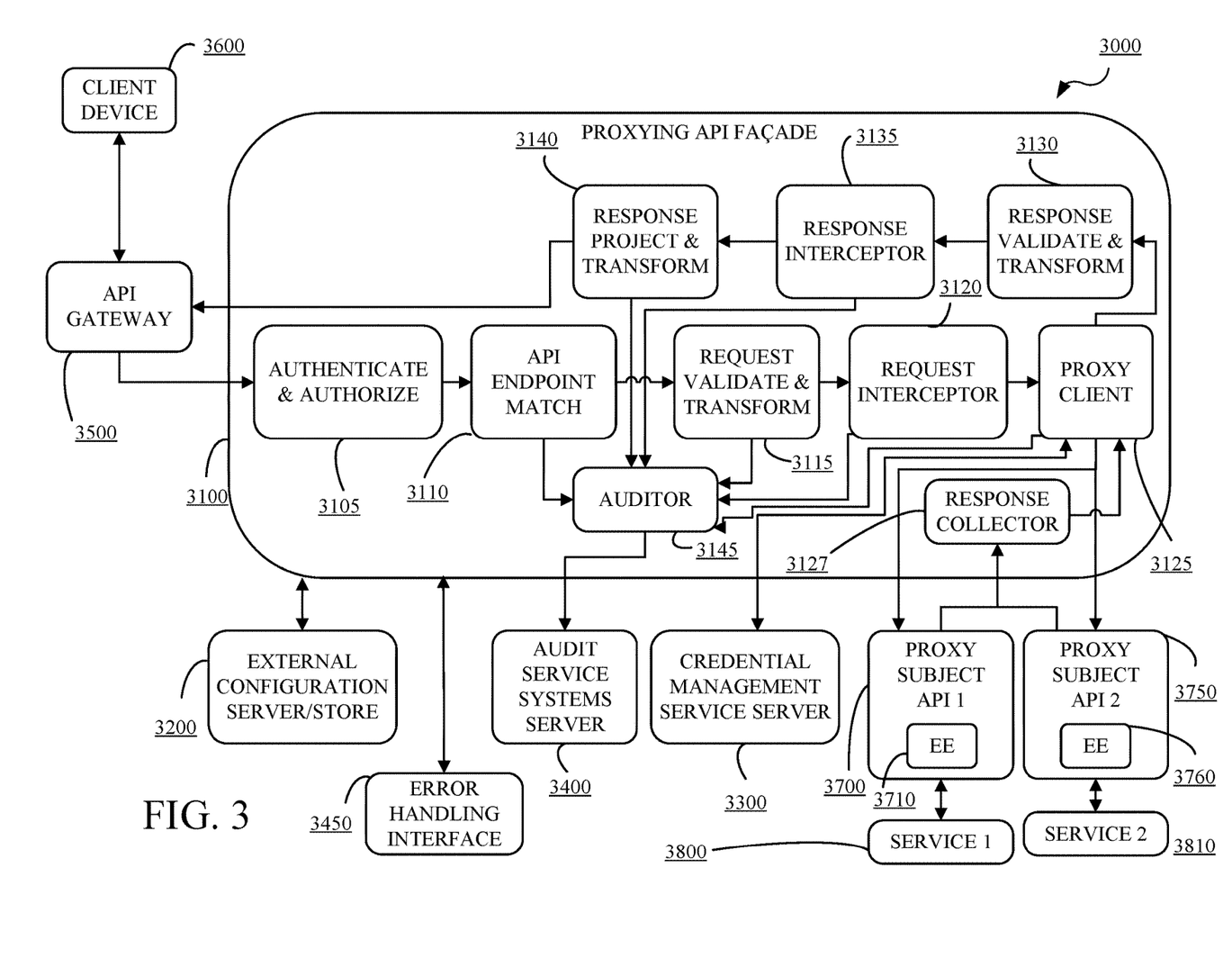
FIG. 3 is a diagram of an example of a network architecture with a proxying API façade instance with a response collector in accordance with embodiments of this disclosure.

FIG. 3 is a diagram of an example of a network architecture 3000 with a proxying API façade instance 3100 in accordance with embodiments of this disclosure. The network architecture 3000 can include a proxying API façade 3100 with can be instantiated on a cloud computing system as shown in FIG. 1, an external configuration server 3200, a credential management server 3300, an audit service systems server 3400, an error handling interface 3450, an API gateway 3500, a client device 3600, and a proxy subject API 1 3700 associated with a service 3800. The proxy subject API 3700 can expose and include, but is not limited to, exposed endpoint (EE) 3710. In some implementations, one or more of the external configuration server 3200, the credential management server 3300, and the audit service server 3400 can be deployed on or integrated on the service provider cloud. Communications between the described devices or elements can include wired communications, wireless communications, or a combination thereof. The network architecture 3000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

The description with respect to FIG. 1 and FIG. 2 are applicable with respect to FIG. 3 except that the proxying API façade 3100 can include a response collector 3127. In addition, the network architecture 3000 can include a proxy subject API 2 3750 with an EE 3760 associated with a service 2 3810.

Operationally, the request from the client device 3600 can have multiple identified exposed endpoints such as exposed endpoint 3710 and exposed endpoint 3760. The responses from the proxy subject API 1 3700/exposed endpoint 3710 and the proxy subject API 2 3750/exposed endpoint 3760 are received at the response collector 3127. In some implementations, the response collector 3127 can aggregate the responses and send to the proxy client 3125 for processing via the response processing. In some implementations, the response collector 3127 can send each response in sequential order to the proxy client 3125 for processing via the response processing.

Figure 4:
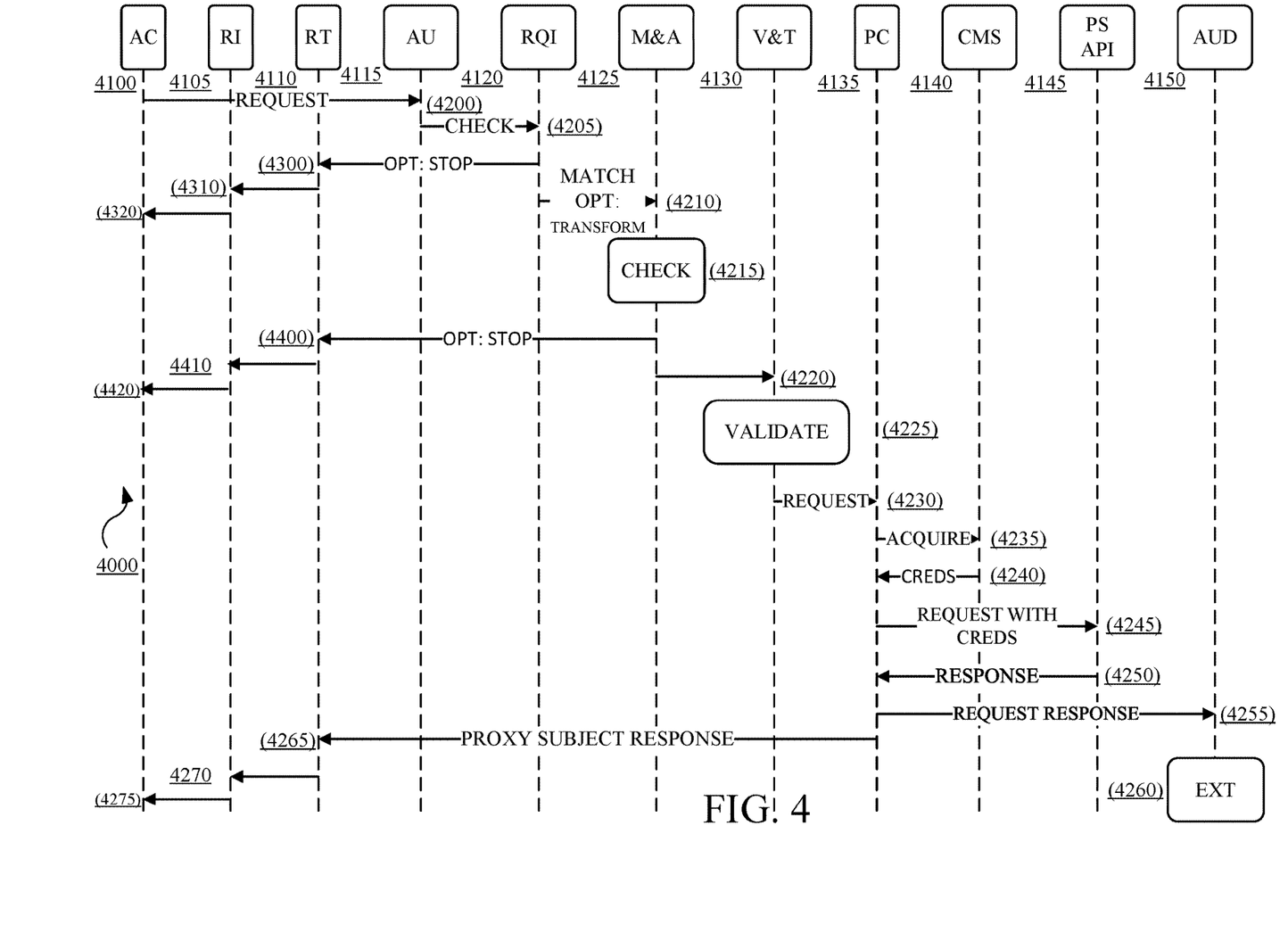
FIG. 4 is a swim diagram of an example request transaction with a proxying API façade instance in accordance with embodiments of this disclosure.

FIG. 4 is a swim diagram 4000 of an example request transaction with a proxying API façade instance in accordance with embodiments of this disclosure. The processing in the swim diagram 4000 is with respect to an API client 4100 (client device), a response interceptor component 4105, a response transformer component 4110, an authentication component 4115, a request interceptor 4120, a match and authorization component 4125, a validate and transformer component 4130, a proxy client 4135, a credential management service server 4140, a proxy subject API 4145, and an auditor component 4150.

A request is sent by the API client 4100 which is processed by the authentication component 4115 (4200). The authenticated request is checked by the request interceptor component 4120 (4205). In an example instance, the request interceptor component 4120 can determine that the request is invalid. The request interceptor component 4120 can stop the request processing and send a request interceptor component response to the response transformer component 4110 (4300). The response transformer component 4110 can prepare a transform response with default parameters to the response interceptor component 4105 (4310). The response interceptor component 4105 can process or prepare an interceptor response with default parameters to the API client 4100 (4320).

In an example instance, the request interceptor component 4120 can determine that the request is valid and can send an interceptor pass response to the match and authorization component 4125 (4210). The match and authorization component 4125 can check, via an external configuration server, for a mapped proxy endpoint match and whether request is authorized (4215). In an example instance, the match and authorization component 4125 can stop the request processing by sending a not match code (e.g., a 404 code) or a no authorization code (e.g., a 403 code) to the response transform component 4110 (4400). The response transformer component 4110 can prepare a transform response with default parameters to the response interceptor component 4105 (4410). The response interceptor component 4105 can process prepare an interceptor response with default parameters to the API client 4100 (4420).

In an example instance, the match and authorization component 4125 can determine that the request matches and is authorized and can send the authorized request to the validate and transform component 4130 (4220). The validate and transform component 4130 can validate and transform as needed (4225). The validate and transform component 4130 can send the processed request to the proxy client 4135 (4230). The proxy client 4135 can acquire proxy subject API access tokens from the credential services system server 4140 (4235). The credential services system server 4140 can send the proxy subject API access tokens to the proxy client 4135 (4240). The proxy client 4135 can make a request to the proxy subject API 4145 using the proxy subject API access tokens (4245). The proxy subject API 4145 can send a response to the proxy client 4135 (4250). The proxy client 4135 can send or pass the request and response to the auditor component 4150 (4255), which in turn can send the audit log to an external auditor service (4260). The proxy client 4135 can send or pass the response to the response transform component 4110 (4265). The response transformer component 4110 can prepare a transform response with default parameters to the response interceptor component 4105 (4270). The response interceptor component 4105 can process prepare an interceptor response with default parameters to the API client 4100 (4275).

Figure 5:
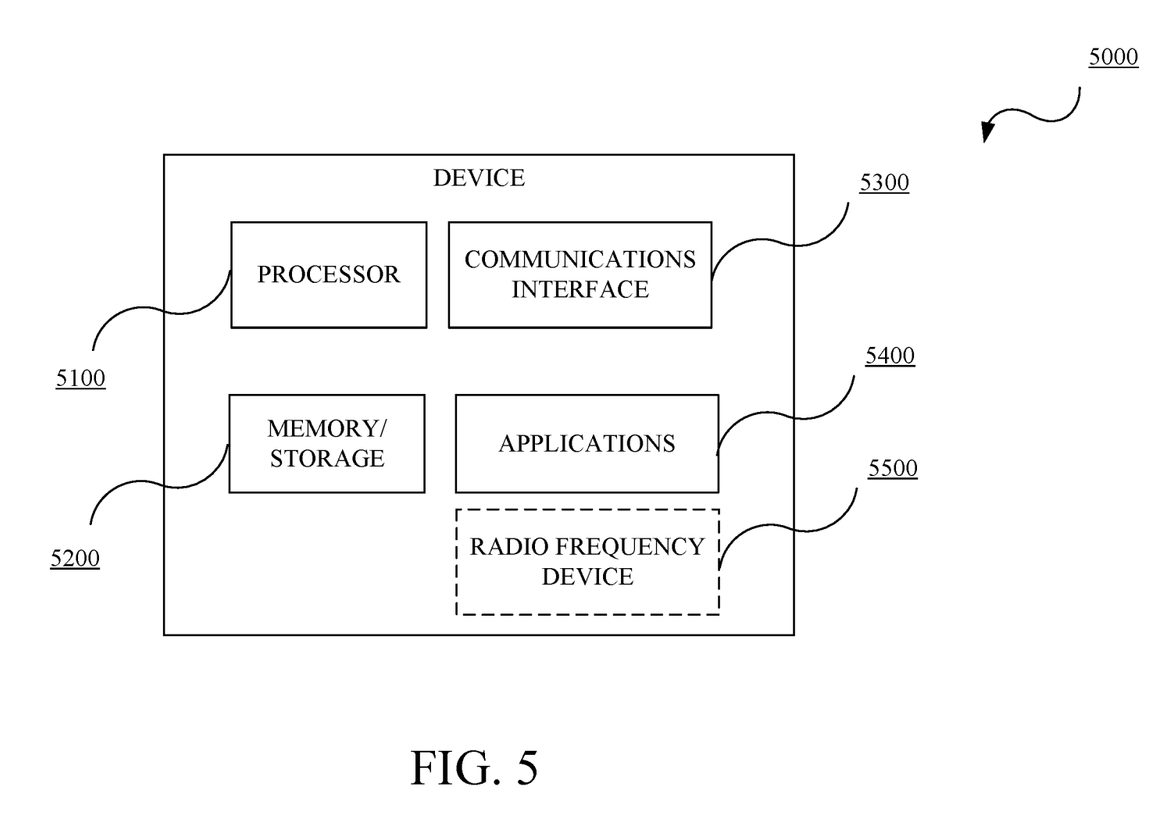
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. In an implementation, the device 5000 may include a radio frequency device 5500. The device 5000 may include or implement, for example, the service provider cloud 1100, the external configuration server 1200, the credential management server 1300, the audit service server 1400, the API gateway 1500, the client devices 1, 2, . . . , N 1600, the proxy subject API 1 1700, the service 1 1750, the proxy subject API 2 1800, the service 2 1850, the proxy subject API 3 1900, the service 3 1950, the external configuration server 2200, the credential management server 2300, the audit service systems server 2400, the error handling interface 2450, the API gateway 2500, the client device 2600, the proxy subject API 2700, the service 2800, the external configuration server 3200, the credential management server 3300, the audit service systems server 3400, the error handling interface 3450, the API gateway 3500, the client device 3600, the proxy subject API 1 3700, the service 3800, the proxy subject API 2 3750, the documentation server 2475, the documentation server 1450, and the service 2 3810. The applicable or appropriate services, techniques or methods described herein may be stored in the memory/storage 5200 and executed by the processor 5100 in cooperation with the memory/storage 5200, the communications interface 5300, the applications 5400, and the radio frequency device 5500 (when applicable), as appropriate. The device 5000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 6:
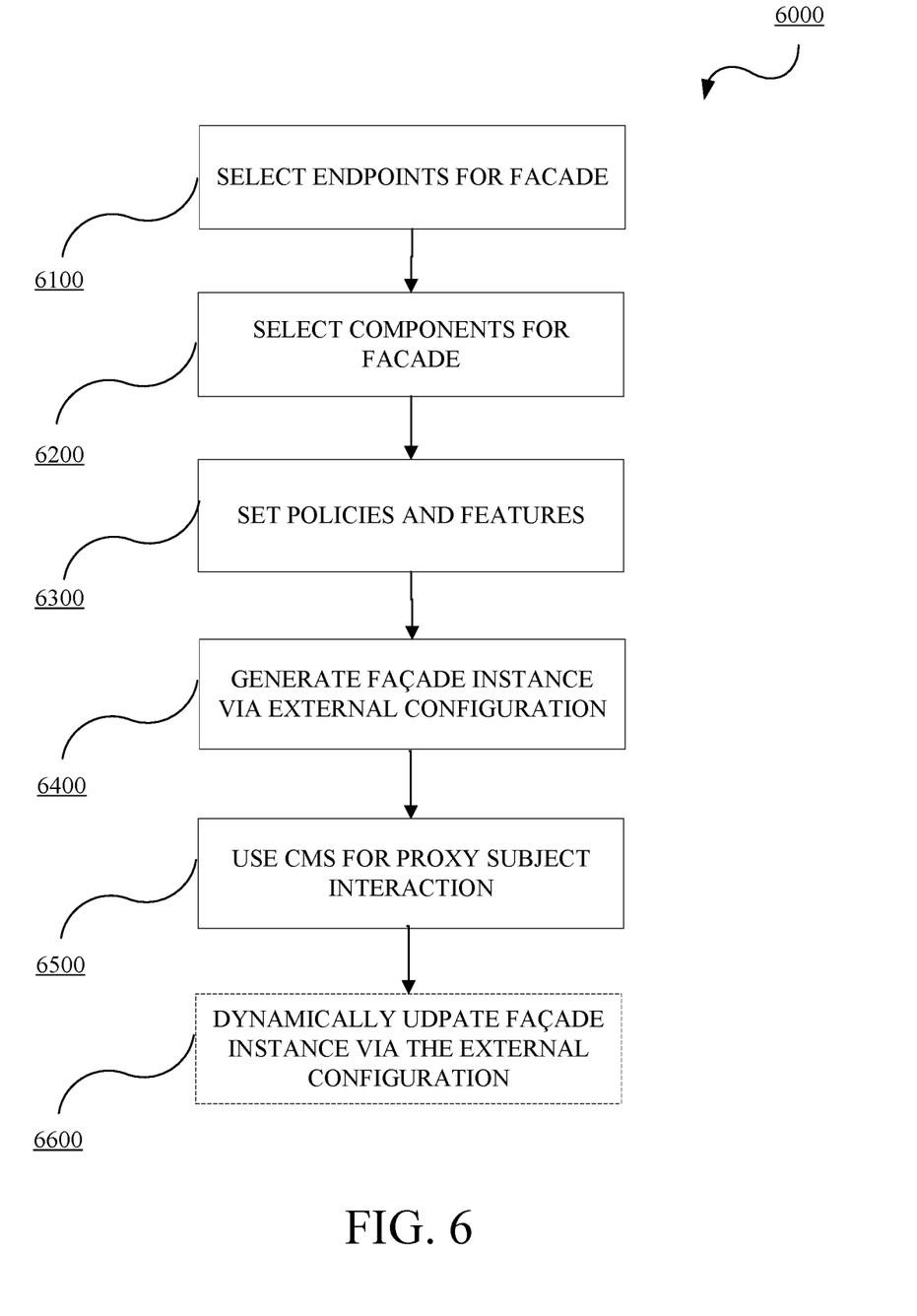
FIG. 6 is a flowchart of an example method for generating a proxying API façade instance using a configurable proxying API façade service in accordance with embodiments of this disclosure.

FIG. 6 is a flowchart of an example method 6000 for generating a proxying API façade instance using a configurable proxying API façade service in accordance with embodiments of this disclosure. The method 6000 includes: selecting 6100 exposed endpoints for a proxying API façade; selecting 6200 components for a proxying API façade; setting 6300 rights and policies; generating 6400 proxying API façade via an external configuration; using 6500 credential management services for proxy subject API access; and dynamically updating 6600 the proxying API façade via the external configuration. For example, the technique 6000 may be implemented, as applicable and appropriate, by the network architecture 1000, the network architecture 2000, the network architecture 3000, the elements contained therein in each of the network architecture 1000, the network architecture 2000, the network architecture 3000, and the device 5000.

The method 6000 includes selecting 6100 exposed endpoints for a proxying API façade. A proxying API façade service can be provisioned or deployed on a cloud platform. A developer user can define or select for one or more a proxying API façades, one or more exposed endpoints associated with one or more proxy subject APIs, where each of the one or more proxy subject APIs is associated with a service.

The method 6000 includes selecting 6200 components for a proxying API façade. The developer user can define one or more components for each of the one or more proxying API façades. The components can be defined on a per proxying API façade basis, a mapped proxy endpoint basis, or combinations thereof. Each mapped proxy endpoint corresponds to a selected exposed endpoint.

The method 6000 includes setting 6300 rights and policies. The developer user can define one or more rights and policies for each of the one or more proxying API façades and/or for each of the one or more components on a per proxying API façade basis, a mapped proxy endpoint basis, or combinations thereof. In some implementations, the rights and policies can be based on the clients and can be defined independent of the service and the proxy subject API.

The method 6000 includes generating 6400 proxying API façade via an external configuration. The defined one or more mapped proxy endpoints, the defined one or more components, and the defined one or more rights and policies can be stored in an external configuration server. The proxying API façade service can load the external configuration server to generate the one or more proxying API façades.

The method 6000 includes using 6500 credential management services for proxy subject API access. A credential management services system can be used to manage access to the proxy subject API. In some implementations, the credential management services system can be used to manage access of the one or more proxying API façades by the client device.

The method 6000 includes dynamically updating 6600 the proxying API façade via the external configuration. The one or more instantiated proxying API façade can be updated using the external configuration. The external configuration can be used to add other proxying API façades without system downtime.

As described herein, a method for using a proxying application program interface (API) façade service includes, for each proxying API façade, selecting one or more exposed endpoints associated with one or more proxy subject APIs, each selected exposed endpoint corresponding to a mapped proxy endpoint in a proxying API façade, selecting one or more components, setting one or more rights and policies, storing one or more mapped proxy endpoints, the one or more components, and the one or more rights and policies as proxying API façade configuration data in an externalized configuration store, generating each proxying API façade by loading a corresponding proxying API façade configuration data from the externalized configuration store, and integrating a proxy client of each proxying API façade with a credential management server, the credential management server configured to authenticate access to a proxy subject API by a proxy client responsive to a client request.

In some implementations, the one or more components are selected on a per mapped proxy endpoint basis, per each proxying API façade, or for all proxying API façades. In some implementations, the one or more rights and policies are set on a per mapped proxy endpoint basis, per selected component basis, per each proxying API façade, or for all proxying API façades. In some implementations, the setting of one or more rights and policies includes setting one or more authentication and authorization policies which are decoupled from authentication and authorization policies of the one or more proxy subject APIs. In some implementations, the method further includes integrating an auditor of each proxying API façade with an external auditing service, wherein the auditor is configured to receive information with respect to requests and responses processed by a corresponding proxying API façade, information from selected components in the corresponding proxying API façade, and information about the corresponding proxying API façade. In some implementations, the method further includes generating, via a documentation server, documentation regarding composition of each proxying API façade and making the documentation available to appropriate clients. In some implementations, the one or more components includes at least one of an authorization and authentication component, an API endpoint match component, a request validation component, a request transform component, a request interceptor, a response validation component, a response interceptor, a response projector, a response collector, and a response transformer. In some implementations, the method further includes integrating an error handling interface with each proxying API façade, the error handling interface configured to provide uniform error handling across all proxying API façades. In some implementations, the method further includes defining default query parameters for each proxying API façade to provide consistent integration with a proxy subject API. In some implementations, access by clients to one or more mapped proxy endpoints in each proxying API façade is provided by integration of the credential management server with each proxying API façade.

As described herein, a service provider system includes a configuration store, a credential management server, and a proxying application program interface (API) façade service deployed in a cloud computing platform. The proxying application program interface (API) façade service configured to, for each proxying API façade, receive an input of one or more exposed endpoints associated with one or more proxy subject APIs, each selected exposed endpoint corresponding to a mapped proxy endpoint in a proxying API façade, receive an input for one or more components, receive an input for one or more rights and policies, store one or more mapped proxy endpoints, the one or more components, and the one or more rights and policies as proxying API façade configuration data in the configuration store, instantiate, on the cloud computing platform, each proxying API façade by loading a corresponding proxying API façade configuration data from the configuration store, and connect a proxy client of each proxying API façade with the credential management server, the credential management server configured to authenticate access to a proxy subject API by a proxy client responsive to a client request.

In some implementations, the one or more components are selected on a per mapped proxy endpoint basis, per each proxying API façade, or for all proxying API façades. In some implementations, the one or more rights and policies are set on a per mapped proxy endpoint basis, per selected component basis, per each proxying API façade, or for all proxying API façades. In some implementations, the proxying application program interface (API) façade service is configured to receive one or more authentication and authorization policies on a per mapped proxy endpoint basis, per selected component basis, per each proxying API façade, or for all proxying API façades, wherein the one or more authentication and authorization policies are decoupled from authentication and authorization policies of the one or more proxy subject APIs. In some implementations, each instantiated proxying API façade includes an auditor connected to an external auditing service, where the auditor is configured to receive information with respect to requests and responses processed by a corresponding proxying API façade, information from selected components in the corresponding proxying API façade, and information about the corresponding proxying API façade. In some implementations, the service provider system further includes a documentation server configured to generate documentation regarding a composition of each instantiated proxying API façade and provide access to the documentation to appropriate clients. In some implementations, the one or more components includes at least one of an authorization and authentication component, an API endpoint match component, a request validation component, a request transform component, a request interceptor, a response validation component, a response interceptor, a response projector, a response collector, and a response transformer. In some implementations, the service provider system further includes an error handling interface configured to provide uniform error handling across all instantiated proxying API façades. In some implementations, the wherein the proxying API façade service is configured to define default query parameters for each proxying API façade to provide consistent integration with a proxy subject API. In some implementations, access by clients to one or more mapped proxy endpoints in each instantiated proxying API façade is provided by integration of the credential management server with each proxying API façade.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for using a proxying application program interface (API) façade service, the method comprising:
for each proxying API façade:
selecting, by a developer, one or more exposed endpoints associated with one or more proxy subject APIs, each selected exposed endpoint corresponding to a mapped proxy endpoint in a proxying API façade;
selecting, by the developer, one or more components;
setting, by the developer, one or more rights and policies;
storing one or more mapped proxy endpoints, the one or more components, and the one or more rights and policies as proxying API façade configuration data in an externalized configuration store;
generating, at runtime, each proxying API façade by loading a corresponding proxying API façade configuration data from the externalized configuration store; and
integrating a proxy client of each proxying API façade with a credential management server, the credential management server configured to authenticate access to a proxy subject API by a proxy client responsive to a client request.

2. The method of claim 1, wherein the one or more components are selected on a per mapped proxy endpoint basis, per each proxying API façade, or for all proxying API façades.

3. The method of claim 1, wherein the one or more rights and policies are set on a per mapped proxy endpoint basis, per selected component basis, per each proxying API façade, or for all proxying API façades.

4. The method of claim 1, wherein the setting of one or more rights and policies includes setting one or more authentication and authorization policies which are decoupled from authentication and authorization policies of the one or more proxy subject APIs.

5. The method of claim 1, further comprising:
integrating an auditor of each proxying API façade with an external auditing service, wherein the auditor is configured to receive information with respect to requests and responses processed by a corresponding proxying API façade, information from selected components in the corresponding proxying API façade, and information about the corresponding proxying API façade.

6. The method of claim 1, further comprising:
generating, via a documentation server, documentation regarding composition of each proxying API façade; and
making the documentation available to appropriate clients.

7. The method of claim 1, wherein the one or more components includes at least one of an authorization and authentication component, an API endpoint match component, a request validation component, a request transform component, a request interceptor, a response validation component, a response interceptor, a response projector, a response collector, and a response transformer.

8. The method of claim 1, further comprising:
integrating an error handling interface with each proxying API façade, the error handling interface configured to provide uniform error handling across all proxying API façades.

9. The method of claim 1, further comprising:
defining default query parameters for each proxying API façade to provide consistent integration with a proxy subject API.

10. The method of claim 1, wherein access by clients to one or more mapped proxy endpoints in each proxying API façade is provided by integration of the credential management server with each proxying API façade.

11. A service provider system, comprising:
a configuration store;
a credential management server; and
a proxying application program interface (API) façade service deployed in a cloud computing platform, the proxying API façade service configured to:
for each proxying API façade:
receive, from a developer, an input of one or more exposed endpoints associated with one or more proxy subject APIs, each selected exposed endpoint corresponding to a mapped proxy endpoint in a proxying API façade;
receive, from the developer, an input for one or more components;
receive, from the developer, an input for one or more rights and policies; and
store one or more mapped proxy endpoints, the one or more components, and the one or more rights and policies as proxying API façade configuration data in the configuration store;
instantiate, on the cloud computing platform, each proxying API façade by loading a corresponding proxying API façade configuration data from the configuration store; and
connect a proxy client of each proxying API façade with the credential management server, the credential management server configured to authenticate access to a proxy subject API by a proxy client responsive to a client request.

12. The service provider system of claim 11, wherein the one or more components are selected on a per mapped proxy endpoint basis, per each proxying API façade, or for all proxying API façades.

13. The service provider system of claim 11, wherein the one or more rights and policies are set on a per mapped proxy endpoint basis, per selected component basis, per each proxying API façade, or for all proxying API façades.

14. The service provider system of claim 11, wherein the proxying API façade service is configured to:
receive, from the developer, one or more authentication and authorization policies on a per mapped proxy endpoint basis, per selected component basis, per each proxying API façade, or for all proxying API façades, wherein the one or more authentication and authorization policies are decoupled from authentication and authorization policies of the one or more proxy subject APIs.

15. The service provider system of claim 11, each instantiated proxying API façade comprising:
an auditor connected to an external auditing service, wherein the auditor is configured to receive information with respect to requests and responses processed by a corresponding proxying API façade, information from selected components in the corresponding proxying API façade, and information about the corresponding proxying API façade.

16. The service provider system of claim 11, further comprising:
a documentation server configured to:
generate documentation regarding a composition of each instantiated proxying API façade; and
provide access to the documentation to appropriate clients.

17. The service provider system of claim 11, wherein the one or more components includes at least one of an authorization and authentication component, an API endpoint match component, a request validation component, a request transform component, a request interceptor, a response validation component, a response interceptor, a response projector, a response collector, and a response transformer.

18. The service provider system of claim 11, further comprising:
an error handling interface configured to provide uniform error handling across all instantiated proxying API façades.

19. The service provider system of claim 11, wherein the proxying API façade service is configured to:
define default query parameters for each proxying API façade to provide consistent integration with a proxy subject API.

20. The service provider system of claim 11, wherein access by clients to one or more mapped proxy endpoints in each instantiated proxying API façade is provided by integration of the credential management server with each proxying API façade.

\* \* \* \* \*